United States Patent [19]
Tadros et al.

[11] Patent Number: 5,293,546
[45] Date of Patent: Mar. 8, 1994

[54] OXIDE COATED METAL GRID ELECTRODE STRUCTURE IN DISPLAY DEVICES

[75] Inventors: Maher E. Tadros, Ellicott City; James A. Mason, Abingdon, both of Md.; Christopher A. Kadoch, San Diego, Calif.

[73] Assignee: Martin Marietta Corporation, Bethesda, Md.

[21] Appl. No.: 686,637

[22] Filed: Apr. 17, 1991

[51] Int. Cl.$^5$ .................. G02F 1/01; G02B 5/23
[52] U.S. Cl. .................. 359/269; 359/266; 359/271
[58] Field of Search .......... 350/357; 340/785; 359/269, 271, 266

[56] References Cited

U.S. PATENT DOCUMENTS

| | | | |
|---|---|---|---|
| 3,879,108 | 4/1975 | Berets | 350/357 |
| 4,006,966 | 2/1977 | Meyers et al. | 350/357 |
| 4,009,936 | 3/1977 | Kasai | 350/160 |
| 4,135,790 | 1/1979 | Takahashi et al. | 350/375 |
| 4,167,308 | 9/1979 | Barclay et al. | 350/357 |
| 4,167,309 | 9/1979 | Barclay et al. | 350/357 |
| 4,213,798 | 7/1980 | Williams et al. | 257/54 |
| 4,233,339 | 11/1980 | Leibowitz et al. | 427/108 |
| 4,256,380 | 3/1981 | Barclay et al. | 350/357 |
| 4,258,984 | 3/1981 | Beni et al. | 350/357 |
| 4,263,105 | 4/1981 | Robillard et al. | 204/2 |
| 4,448,493 | 5/1984 | Matsudaira et al. | 350/357 |
| 4,459,035 | 7/1984 | Nanya et al. | 368/241 |
| 4,550,982 | 11/1985 | Hirai | 350/357 |
| 4,596,635 | 6/1986 | Warszawski | 204/2 |
| 4,749,260 | 6/1988 | Yang et al. | 350/357 |
| 4,768,865 | 10/1988 | Greenberg et al. | 350/357 |
| 4,772,760 | 10/1988 | Graham | 174/35 |
| 4,845,310 | 7/1989 | Postupack | 174/35 |
| 4,887,890 | 12/1989 | Scherber et al. | 350/357 |
| 4,892,394 | 1/1990 | Bidabad | 350/357 |
| 4,960,324 | 10/1990 | Brown | 350/357 |
| 4,993,810 | 2/1991 | Demiryont | 350/357 |

FOREIGN PATENT DOCUMENTS 0300910 7/1988 European Pat. Off. ........ G02F 1/17
109317 8/1981 Japan ........................... G02F 1/17

OTHER PUBLICATIONS

C. M. Lampert and C. G. Granqvist, "Introduction to Chromogenics", *Large-Area Chromogenics: Materials and Devices for Transmittance Control*, SPIE Institute Series vol. IS 4, pp. 2–19 (1990).

Kuo-Chuan Ho, David E. Singleton & Charles B. Greenberg: "Effect of Cell Size on the Performance of Electrochromic Windows," *Proceedings of the Symposium on Electrochromic Materials*, Proceedings-The Electrochemical Society, vol. 90 No. 2 pp. 349–364 (1989).

Richard M. Bendert and Dennis A. Corrigan: "Effect of Coprecipitated Metal Ions on the Electrochromic Properties of Nickel Hydorxide", *J. Electrochem. Soc.*, vol. 136 No. 5, May 1989, pp. 1369–1374.

*Primary Examiner*—Rolf Hille
*Assistant Examiner*—Mahshid Saadat
*Attorney, Agent, or Firm*—Gay Chin; Bruce M. Winchell; Alan G. Towner

[57] ABSTRACT

An improved working electrode for use in display devices is disclosed. The working electrode comprises a transparent metal grid having a coating of metal oxide thereon. Suitable metal grids include Cu, Au, Ag, Al, Pt, Ni and Zn, while suitable metal oxide coatings include $In_2O_3$, $SnO_2$ and indium tin oxide (ITO). The display devices preferably include an electrochromic material comprising an aqueous solution of an electrochemically depositable metal. Display devices in which the present working electrode is used possess favorable characteristics such as rapid response times, wide dynamic range, high transmittance and improved uniformity. The devices are particularly suitable for large surface area applications.

19 Claims, 2 Drawing Sheets

OXIDE COATED METAL GRID ELECTRODE STRUCTURE IN DISPLAY DEVICES

FIELD OF THE INVENTION

The present invention relates to display devices. More particularly, the invention relates to an improved working electrode for use in display devices which provides rapid response times, wide dynamic range, high transmittance and improved uniformity. The devices are particularly suitable for large area applications.

BACKGROUND OF THE INVENTION

Numerous processes are known for the modulation of visible light. Among these processes, electrochromic techniques use the reversible change of color and/or optical density obtained by an electrochemical redox reaction of an electrochromic material in which the oxidized form and reduced form are of different colors and/or different optical densities.

Electrochromic materials change their optical properties due to the action of an electric field and can be changed back to the original state by a field reversal. In most electrochromic materials, the mechanism underlying the optical change is the insertion of ions into the electrochromic material and the subsequent extraction of the same ions. The devices can show open circuit memory, i.e., voltage has to be applied only when the optical properties are to be altered. Most electrochromic devices require an ion-containing material (electrolyte) in proximity with the electrochromic layer as well as transparent layers for setting up a distributed electric field.

Recently it has become evident that electrochromism occurs in numerous transition metal oxides and organic materials [See C.M. Lampert and C.G. Granqvist, "Introduction to Chromogenics", *Large-Area Chromogenics: Materials and Devices for Transmittance Control*, SPIE Institute Series Vol. IS 4, pp 2-19 (1990)].

Many applications exist for electrochromic materials including display panels, variable transmittance windows and variable reflectance mirrors. Prior art electrochromic materials include metal oxides such as $WO_3$, $MO_3$, $V_2O_5$, $Ir_2O_3$ and $Nb_2O_5$, polymers such as polyaniline, polyacetylene, polypyrrole and polythiophene, and aqueous solutions of metal ions such as Zn.

U.S. Pat. No. 4,009,936 issued Mar. 1, 1977 to Kasai discloses electrochromic display devices including a solid electrochromic material and a solid electrolyte. The electrochromic material is selected from tungsten oxide, molybdenum oxide, titanium oxide, vanadium oxide, cobalt tungstate, tin oxide, tellurium oxide, iron oxide, rare earth oxides, metal halides, strontium titanate, metal carbonyls, salicylidene aniline, and organic materials containing a hydrazone group, an osazone group, a semicarbazone group or a sydnone group. The electrolyte is selected from $Ag_7I_4PO_4$, AgI, and AgI in combination with a member of the $Ag_4P_2O_7$ series, the $Ag_2WO_4$ series, the RbI series, the $NH_4I$ series, the KCN series, or the $C_4H_8SCH_3I$ series. The display devices also include a transparent electrode in contact with the electrochromic material comprising a conductive film of unspecified composition coated on a glass substrate. The devices are said to be useful for display purposes, e.g., timepieces and the like.

U.S. Pat. No. 4,448,493 issued May 15, 1984 to Matsudaira et al discloses electrochromic display devices including an electrochromic layer and a solid proton conductive layer. The electrochromic layer consists of a transition metal oxide such as $WO_3$, $MoO_3$, $TiO_2$, $Ir_2O_3$, $Rh_2O_3$, NiO or $V_2O_5$. The proton conductive layer comprises a mixture of acids selected from titanic, stannic, antimonic, zirconic, niobic, tantalic and silicic acid. The display devices also include a transparent electrode contacting the electrochromic material and comprising a thin film of indium oxide ($In_2O_3$) or tin oxide ($SnO_2$) deposited on a transparent substrate such as glass or synthetic resin. The disclosed devices are said to possess shortened response times, with speeds on the order of 1 to 10 seconds being exemplary.

U.S. Pat. No. 4,459,035 issued Jul. 10, 1984 to Nanya et al discloses electrochromic display devices including a reduction electrochromic material and an oxidation electrochromic material separated by an ion permeable insulating layer. The reduction electrochromic material is $WO_3$ or $MoO_3$, while the oxidation electrochromic material is iridium hydroxide $[Ir(OH)_n]$, rhodium hydroxide $[Rh(OH)_n]$ or nickel hydroxide $[Ni(OH)_n]$. As the ion permeable insulator, $Ta_2O_5$, $Cr_2O_3$ or $SiO_2$ may be used. The display devices also include a transparent electrode contacting the reduction electrochromic material and a counter electrode contacting the oxidation electrochromic material. During operation of the device, the oxidation electrochromic material is said to function as an acceptor of protons, thereby preventing evolution of hydrogen gas on the surface of the counter electrode. The devices may be used as display panels for electronic timepieces.

U.S. Pat. No. 4,233,339 issued Nov. 11, 1980 to Leibowitz et al discloses electrochromic display devices including an electrochromic material and an electrolyte. The electrochromic material may comprise $WO_3$ which has been partially converted from the amorphous to the crystalline form which is said to significantly increase the etch resistance of the material, thereby increasing the useful life of the device. The electrolyte may be liquid, gel, paste or solid. The display devices also include a transparent electrode in contact with the electrochromic material comprising a conductive layer, such as tin oxide, deposited on a transparent glass or plastic substrate.

Japanese Patent No. 56-109317 to Nagasawa et al, published Aug. 29, 1981, discloses electrochromic display devices having a layer of amorphous $WO_3$ and a layer of crystalline $WO_3$ separated from each other by an ion conductive layer such as SiO, $Al_2O_3$, $ZrO_2$, $MgF_2$ or $CaF_2$. The devices also include a transparent electrode in contact with each of the $WO_3$ layers comprising tin oxide, indium oxide or indium tin oxide (ITO). The crystalline $WO_3$ is said to maintain a coulomb balance within the devices and to produce long life and high reliability.

U.S. Pat. No. 4,135,790 issued Jan. 23, 1979 to Takahashi et al discloses electrochromic elements comprising a thin layer of electrochromic material and a thin layer of electron blocking material sandwiched between a pair of transparent electrodes to form a unit cell. Multiple unit cells are stacked together to form a multi-layer structure. The electrochromic material may be $WO_3$ or $MoO_3$. The use of multiple thin layers of electrochromic material is said to reduce the response times of the devices.

U.S. Pat. No. 4,768,865 issued Sep. 6, 1988 to Greenberg et al discloses transparent electrochromic windows using $WO_3$ as the electrochromic material along with a layer of ion conductive material. A counter electrode in the form of a metal grid is placed in contact with the ion conductive material. The metal grid participates in a balancing half-cell reaction whereby the metal grid is oxidized or reduced in response to the electrochromic transition of the $WO_3$. Use of the metal grid is said to allow operation of the device at lower potentials which prevents electrolysis of water and concurrent gas evolution. The devices have a response time on the order of two minutes. Similar devices are disclosed by Kuo-Chuan Ho, David E. Singleton and Charles B. Greenberg in an article: "Effect of Cell Size on the Performance of Electrochromic Windows," *Proceedings of the Symposium on Electrochromic Materials*, Proceedings—The Electrochemical Society, Vol. 90, No. 2 pp. 349-364 (1989).

U.S. Pat. No. 4,887,890 issued Dec. 19, 1989 to Scherber et al discloses transparent electrochromic panes or foils including an electrochromic polymer layer and an electrolyte layer sandwiched between two transparent electrodes. Suitable polymers include polyaniline, poly-O-phenyldiamine, polyaniline-3-sulfanic acid, polypyrol and polythiophene, while suitable electrolytes include polymeric sulfonic acid, polymeric carbonic acid, buffered $H_2SO_4$, buffered $HClO_4$ and HCl. Suitable transparent electrodes include $In_2O_3/SnO_2$ (ITO), $SnO_2$, $In_2O_3$, Mo, Pd, Pt, Rh, Ti and ZnSe which may be coated on a glass pane or foil. The devices are said to have response times on the order of a few seconds.

U.S. Pat. No. 4,749,260 issued Jun. 7, 1988 to Yang et al discloses transparent electrochromic display devices including a layer of polyaniline electrochromic material and a layer of electrolyte material disposed between two transparent electrodes. The electrodes comprise a transparent conductive coating such as $SnO_2$, $In_2O_3$, Pt or Au deposited on a glass or plastic sheet. The devices may employ multiple layers of electrochromic materials to produce tint and color changes.

U.S. Pat. No. 4,550,982 issued Nov. 5, 1985 to Hirai discloses electrochromic display devices including a layer of electrochromic material and a layer of electrolyte material disposed between two transparent electrodes. The electrochromic material consists of a polymer film comprising at least one organic electrochromic material and at least one ionic material wherein the ionic material is capable of exchanging ions with the organic electrochromic material to serve as an ion donor or acceptor. Suitable electrodes include $SnO_2$ or ITO coated on a glass or plastic plate. The devices possess a response time on the order of 0.5 to 6 seconds.

In an article by Richard M. Bendert and Dennis A. Corrigan entitled: "Effect of Coprecipitated Metal Ions on the Electrochromic Properties of Nickel Hydroxide," *J. Electrochem. Soc.*, Vol. 136, No. 5, May 1989, pp. 1369-1374, electrochromic films are disclosed comprising nickel hydroxide alone and in combination with minor amounts of other metal hydroxides. The films are said to possess lo high coloration efficiency throughout the visible region and to be useful in window applications.

U.S. Pat. No. 4,263,105 issued Apr. 21, 1981 to Robillard et al discloses electrosensitive recording materials having an electrosensitive layer comprising a bismuth or antimony salt and a semiconductor oxide pigment, such as $TiO_2$, ZnO, $SnO_2$ or $Al_2O_3$, dispersed in a binder. The electrosensitive layer is deposited on a conductive layer, such as a metal foil, which in turn is laminated on a paper sheet or plastic film substrate. Permanent recordings may be formed by contacting the electrosensitive layer with a writing electrode.

U.S. Pat. No. 4,596,635 issued Jun. 24, 1986 to Warszawski discloses recording media comprising an electrosensitive layer coated on a substrate such as paper or plastic film. The electrosensitive layer comprises a homogeneous aqueous solution of a hydrosoluble salt of a cathodically depositable metal and a hydrosoluble polymer resin. Suitable electrodepositable metals are said to be Zn, Cd, Pb, Ag, Cu, Fe, Ni, Co, Sn, In, Pt, Pd, Au, Bi, Sb, Te, Se, Mn, Tl, Ga, As, Hg and Cr. Suitable polymer resins include hydroxyethylcellulose and carboxymethylcellulose. Permanent recordings may be produced by contacting the electrosensitive layer with a writing electrode.

European Patent Application Publication No. 0300919 of Warszawski, published Jan. 25, 1989, which is hereby incorporated by reference, discloses electrochromic display devices comprising an electrolytic material disposed between two electrodes. The electrolytic material comprises a water soluble salt of a cathodically depositable metal and a watersoluble polymer resin. Suitable cathodically depositable metals are said to include Zn, Cd, Pb, Ag, Cu, Fe, Co, Ni, Sn, In, Pt, Pd, Au, Bi, Sb, Te, Mn, Ti, Se, Ga, As, Hg, Cr, W and Mo, while suitable polymer resins include hydroxyethylcellulose, polyvinyl alcohol and polyvinylpyrrolidone. The electrodes comprise a first transparent working electrode and a second counter electrode which may, or may not, be transparent, depending on the desired application. The working electrode may comprise a thin layer of gold, tin oxide, indium oxide or ITO deposited on a glass or plastic substrate, while the counter electrode may comprise a flexible graphite sheet, a plastic material filled with particles of carbon or metal, or a glass or plastic sheet coated with a thin layer of semiconductor oxide. The disclosed devices are useful for the display of alphanumeric, graphic and other visual information.

SUMMARY OF THE INVENTION

An object of the present invention is to provide a new working electrode for use in display devices. Another object of the present invention is to provide an improved working electrode for large area display devices, the electrode comprising a metal grid having a metal oxide coating thereon.

Another object of the present invention is to provide an improved display device which is characterized by rapid response times, wide dynamic range, high transmittance and improved uniformity. The devices are particularly suited for large area applications.

DETAILED DESCRIPTION OF THE INVENTION

In accordance with the present invention, a display device is provided comprising a working electrode, a counter electrode, and an electrochromic material disposed therebetween.

Figure 1:
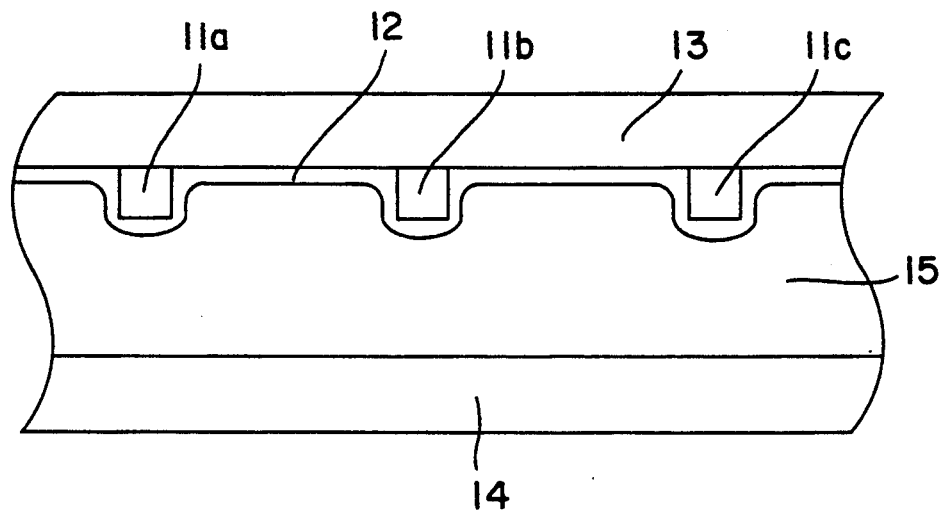
FIG. 1 is a schematic side cross-sectional view of a display device according to the present invention.

The working electrode comprises an electrically conductive metal grid or bus having a coating of metal oxide thereon. The metal grid and coating are preferably disposed on a transparent substrate which serves to provide structural integrity. FIG. 1 illustrates a cross section of a display device in accordance with one embodiment of the present invention. Metal grid 11a, 11b and 11c (shown in cross section) is coated with a metal oxide layer 12. A substrate 13 serves to support the metal grid 11a, 11b and 11c and metal oxide layer 12. A counter electrode 14 is provided in contact with an electrochromic material 15 which in turn is in contact with the metal oxide layer 12. Electrical contacts (not shown) may be connected in a conventional manner to the working electrode 11a, 11b and 11c and counter electrode 14. It is noted that the elements illustrated in FIG. 1 are not to scale.

Figure 2:
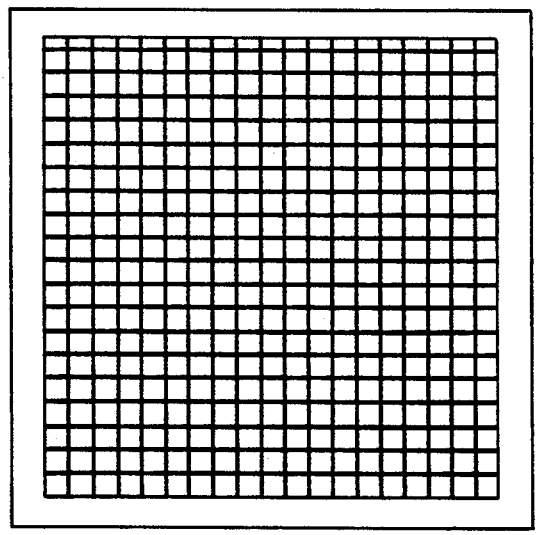
FIG. 2 is a topographical view of a metal grid used in a working electrode of the present invention.

The metal grid is chosen such that it does not substantially reduce transparency while insuring uniform rapid charge distribution over a large surface area. The grid may be made of any suitable metal, preferably metals having high electrical conductivity. Suitable metals include Cu, Au, Ag, Al, Zn, Ni and Pt, with Au being a preferred metal due to its high conductivity and chemical inertness. The metal grid may be patterned in any desired geometry, such as square, rectangular, hexagonal, circular, parallel lines, etc. FIG. 2 shows a preferred metal pattern in which a square grid is surrounded by a relatively thick bus. The bus is used to facilitate electrical connection to the grid and to increase speed during operation of the display device. While the description provided in the present disclosure focuses on the use of a square grid geometry, it should be recognized that other configurations are also within the scope of the present invention. In the typical grid pattern, line widths of from about 5 to about 200 microns may be used, with widths of about 20 microns being preferred. Line spacings of from about 100 to about 2000 microns may be employed, with spacings of about 500 microns being preferred. Line heights of from about 0.1 to about 100 microns are suitable, with heights of from about 0.2 to about 3 microns being preferred. In order to provide sufficient transparency, the lines of the grid should cover less than 50 percent of the surface area, preferably less than about 25 percent, more preferably less than about 10 percent and most preferably less than about 5 percent of the surface. However, the lines should be of sufficient size and spacing to permit a uniform rapid charge distribution over the surface of the electrode. The electrical resistivity of the metal grid may range from about 0.02 to about 3 ohms per square, with about 0.4 ohms per square being preferred. For purposes of the present invention the term "ohms per square" is used to designate sheet resistivity over a given surface area in a manner conventional in the conductive coatings art.

The metal grid is preferably formed on a substrate by such conventional methods as sputtering, chemical vapor deposition (CVD), and the like. The substrate provides structural integrity to the metal grid and is chosen such that it is transparent in the desired spectral region. The substrate may be glass, such as soda glass or borosilicate glass, may be a polymer, such as polyethylene, polytetrafluoroethylene (Teflon) or polyester (Mylar), or may be a transparent crystalline material, such as ZnS or ZnSe. In uses where durability or flexibility is desired, polymer substrates may be preferred.

The working electrode of the present invention also comprises an electrically conductive metal oxide coating over the metal grid. The metal oxide coating prevents unwanted reactions between the grid and the electrochromic material and also provides improved characteristics, such as uniformity and wide dynamic range. The metal oxide coating is selected such that it is electrically conductive and transparent. Suitable metal oxides include indium oxide ($In_2O_3$), tin oxide ($SnO_2$), indium tin oxide (ITO), zinc oxide (ZnO) and cadmium stannate, with indium tin oxide being the most preferred. The metal oxide is doped with minor amounts of constituents such as flourine, antimony, aluminum, etc. in a known manner to achieve sufficient electrical conductivity. The metal oxide coating may preferably range in thickness from about 50 to about 2000 Angstroms, with a thickness of about 1000 Angstroms, being most preferred. The electrical resistivity of the metal oxide coating may preferably range from about 10 to about 10,000 ohms per square, with lower resistivity being preferred for increased speed. Resistivities of from about 100 to about 200 ohms per square have been found to be particularly advantageous.

As the counter electrode, any suitable electrically conductive material may be used. For example, the counter electrode may comprise a metal such as Cu, Au, Pb, Sn, Zn or stainless steel. The metal may be provided in the form of a relatively thick sheet sufficient to provide structural support for the device. Alternatively, the metal may be provided as a thin coating on a substrate such as a conventional circuit board. The counter electrode may also comprise carbon, e.g., in the form of a graphite sheet, or a Polymer impregnated with metal or carbon particles. The counter electrode may be rigid or flexible depending upon the application sought. In addition, the counter electrode may be opaque or transparent, depending upon the use of the device. If transparency is desired, the counter electrode may comprise a metal grid or thin layer of electrically conductive material.

As the electrochromic material, several types of materials may be used, with the most preferred comprising an aqueous solution of an electrochemically depositable metal. Alternative electrochromic materials include polymers such as polyaniline, polyacetylene, polypyrrole and polythiophene, metal oxides such as $WO_3$, $MoO_3$ and $Ni(OH)_2$, and Prussian blue. Each of these alternative materials is used in conjunction with another electrolyte layer in a known manner to achieve the electrochromic effect. While the present disclosure focuses on electrochromic materials comprising aqueous solutions of electrochemically depositable metals, it should be recognized that other types of electrochromic materials are within the scope of the present invention.

The preferred electrolytic material according to the present invention comprises a mixture of at least one water soluble salt of a metal that is cathodically depositable from an aqueous solution of its simple or complex ions, at least one polymeric resin preferably in the ratio of one part by weight for 0.05 to 50 parts of anhydrous salt, and water. In addition, the electrolytic material may comprise additional redox couples, nonelectrochemically depositable metals, pigments, acids, reticulation agents, complexing agents and forming or application agents.

The water soluble salt may comprise a metal selected from zinc, cadmium, lead, silver, copper, iron, cobalt, nickel, tin, indium, platinum, palladium, gold, bismuth, antimony, tellurium, manganese, thallium, selenium, gallium, arsenic, mercury, chromium, tungsten, molybdenum and combinations thereof. Preferred metals include zinc, nickel and cobalt.

The metallic salts usable in this invention are ionic complexing where the metal is present in the form of a cation or incorporated in a cationic complex. The pH of these compositions is chosen such that the compositions become substantially completely soluble in an aqueous medium. Suitable anions include chloride, nitrate, sulfate, borate, fluoride, iodide, bromide, fluoroboride, fluorosilicate, fluorogallate, dihydrogenophosphate, chlorate, perchlorate, bromate, selenate, thiosulfate, thiocyanate, formate, acetate, butyrate, hexanoate, adipate, citrate, lactate, oleate, oxalate, propionate, salicylate, glycinate, glycocollate, glycerophosphate, tartrate, acetyl-acetonate, isopropylate, benzoate, malate, benzene sulfonate and 1 phenol-4 sulfonate. It is found to be particularly advantageous to have halogen anions (chloride, bromide, iodide, fluoride) in the electrolytic material.

The polymeric resins used comprise resins capable of forming aqueous solutions and also resins capable of forming colloidal dispersions in water. Exemplary polymers include polyvinylpyrrolidone, polyvinyl alcohol, poly-2-acrylamido-2-methylpropane sulfonic acid and hydroxyethylcellulose. The polymeric resin preferably confers to the material a viscosity which facilitates application in thin layers.

Water is preferably present in a maximum amount such that the electrolytic material retains a solid consistency in the absence of external constraints. Water should be provided in a minimum amount such that a sufficient ratio of water to the water soluble salt is achieved.

At least one solid can be dispersed in a homogenous manner in the electrolytic material particularly to improve or modify the mechanical properties, the appearance of the device, and the diffusion and reflection of light. In particular one such solid is a pigment which masks the counter electrode to provide a background offering the most desirable contrast or color. Numerous mineral and organic pigments, both white and colored, can be used as long as they do not substantially interact chemically with the other constituents of the electrolytic material. A preferred white pigment in most du electrolytic media according to the present invention and possessing great covering power as well as a high index of whiteness is titanium dioxide principally in the form of rutile and anatase crystals. The pigment can be used in association with a colored pigment either as a mixture or in superposition in a composite layer of electrolytic material which permits modification of the color saturation and/or for a background color improvement in the high covering power of the titanium dioxide. Such colored pigments are for example zinc chromate, cobalt blue and chrome oxide. One can likewise mix titanium oxide and a soluble colorant. Numerous colorants, particularly the type used for watercolor paintings, are usable with the reservation that they must not interact chemically with the other constituents of the electrolytic material.

The electrolytic material of the present invention is produced by dissolution of the water soluble constituents and dispersion of the nonsoluble constituents in water followed by evaporation of a part of this water or, in contrast, dissolution by an addition of water up to the point of obtaining a suitable viscosity. One characteristic of this mode of fabrication of the electrolytic material is to permit adjustment of the viscosity of the electrolytic material between limits of a liquid approaching water to that of a solid paste. One can thus adjust the viscosity for the chosen mode of application of the electrolytic material. Application may be achieved by, for example, xerography, air layer, bar wire, scraping, extrusion, dipping, tape casting or any other suitable technique for forming a thin film of the material.

The electrolytic material is applied to one or more of the electrodes in a thin layer. The material is then dried (by hot air, infrared, exposure to the surrounding atmosphere, etc.) up to the point of obtaining material of solid consistency in the final composition. It can also be subjected eventually to an additional treatment for example a thermal treatment to obtain accelerated reticulation of the resin. Thicknesses of the electrolytic material may range from less than 1 to greater than 1000 microns with 100 to 200 microns being preferred.

The electrolytic material can be coated or applied to an electrode in a single layer or in many layers consecutively with intermediate or simultaneous drying. The different layers can be of identical composition or may comprise different percentages of total constituents. One may thus obtain a layer of electrolytic material of composite structure.

In order to retain sufficient water content in the electrolytic material, a seal is preferably used between the working electrode and counter electrode. The seal may comprise an adhesive, such as epoxy, and is selected such that it has a sufficiently low permeability to water to prevent unwanted drying of the electrolytic material. Where polymeric substrates are used in the working electrode, care should be taken that the polymer has low water permeability. Sealants may be applied to the substrate in order to prevent drying.

Display devices incorporating the above described electrolytic material, and using the working electrode of the present invention comprising a metal grid having a metal oxide coating thereon, have been found to possess highly advantageous characteristics. It has been found that the metal oxide coating provides for substantially uniform deposition of metal ions from the electrolytic material during operation of the device. The metal oxide coating allows for metal deposition over the entire surface of the working electrode, which prevents transmittance of light through the working electrode during operation. Absent the metal oxide coating, the metal ions contained within the electrolytic material do not deposit uniformly over the entire electrode surface. Instead, the metal ions deposit directly on the metal grid, leaving the areas between the grid lines uncoated, which allows light to pass through the electrode during operation. The metal oxide coating of the present invention is therefore essential to the operation of the disclosed display devices.

Figure 3:
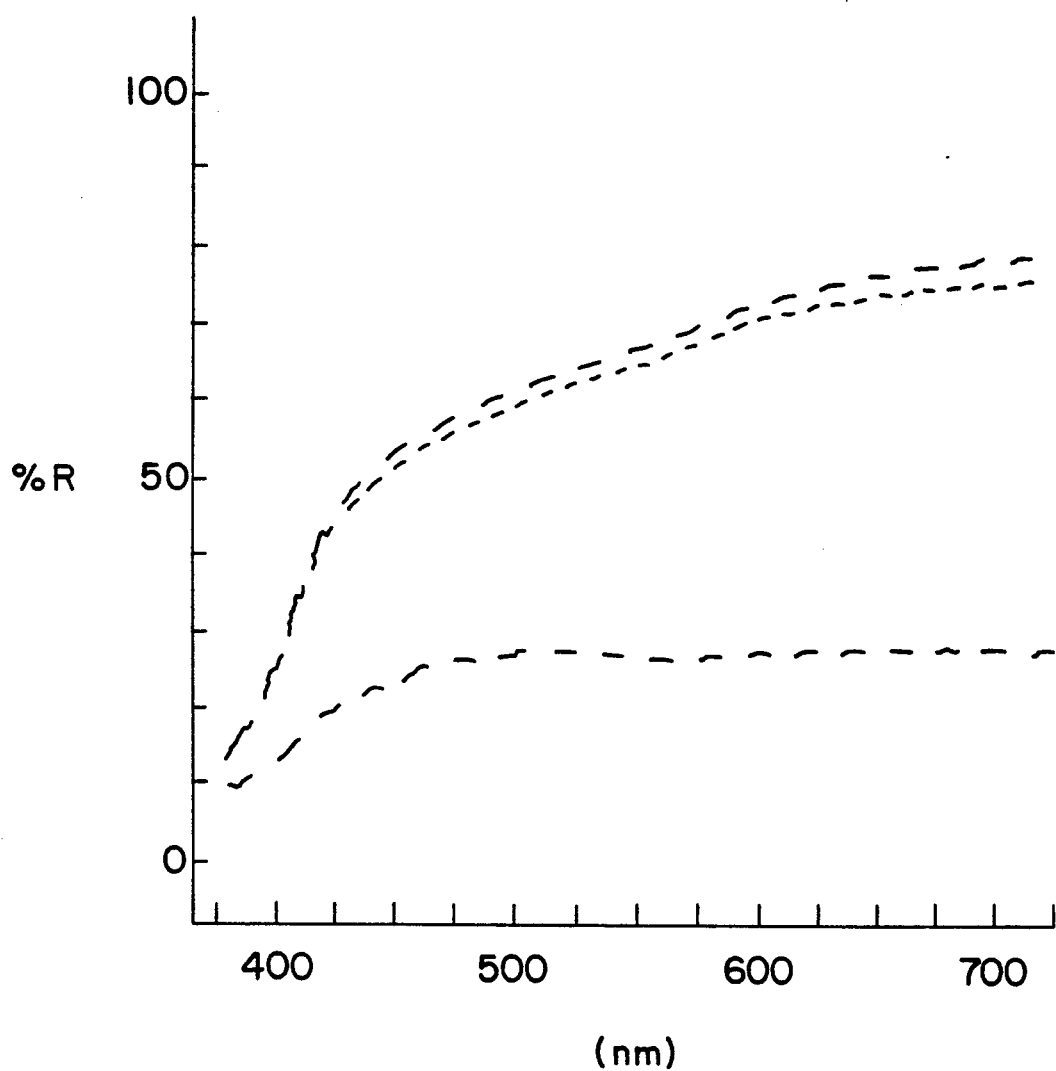
FIG. 3 is a graph showing the effect of an electric field reversal on the percent reflectance of a display device of the present invention at varying wavelengths.

FIG. 3 graphically shows reflectance characteristics over varying wavelengths for a typical display device in accordance with the present invention. When an electric field is applied to the working electrode acting as an anode, the device turns white, as evidenced by the high reflectivity of well over 50 percent and typically over 70 percent. When the electric field is reversed and the working electrode acts as the cathode, the device turns black, as can be seen by the low reflectivity of below 30 percent. A wide dynamic range is therefore demonstrated.

In accordance with the present invention, the use of a working electrode in conjunction with a display device as presently disclosed results in extremely fast switching speeds. Speeds of less than 500 milliseconds are typical, with speeds of less than 200 milliseconds being preferred and less that 100 milliseconds being most preferred.

The following examples illustrate various aspects of the present invention and are not intended to limit the scope thereof.

EXAMPLE 1

A working electrode is produced by the following techniques. A gold coating is applied to a polyethylene substrate by sputtering to a thickness of 0.2 micron. The gold is then etched by photolithography to form a 2.54 cm by 2.54 cm (1 inch by 1 inch) square grid having a grid pattern similar to that shown in FIG. 2. The grid has line spacings of 500 microns, line widths of 20 microns and line heights of 0.2 micron. A coating of indium tin oxide is then deposited on the grid and substrate by sputtering at room temperature. The indium tin oxide coating has a thickness of approximately 1000 Angstroms and a sheet resistivity of about 100 ohms per square. An electrolyte is prepared by forming an aqueous solution of 25 percent zinc bromide. Thirty weight percent polyvinyl alcohol is dissolved in the solution. Pigment grade $TiO_2$ is then mixed into the solution to a concentration of 40 percent by weight. The solution is thoroughly stirred and degassed. A counter electrode is formed from a 2.29 cm by 2.29 cm (0.9 inch by 0.9 inch) glass epox circuit board to which a 25 micron (1 mil) thick sheet of copper has been clad. The electrolyte is sandwiched between the working electrode and counter electrode to a thickness of about 125 microns (5 mils). The edges of the device are sealed with epoxy to provide a seal that maintains the water content in the electrolyte. Electrical contacts are attached to each of the working electrode and counter electrode. A 1.5 volt electric field is applied between the working electrode and counter electrode, with the working electrode serving as the cathode. Within 100 milliseconds of application of the electric field, the device turns black, resulting in a reflectivity in the visible range of less that 30 percent. Reversal of polarity results in bleaching of the device back to a white state within 100 milliseconds, resulting in a reflectivity of visible light of greater than 70 percent.

EXAMPLE 2

Example 1 is repeated with the exception that Cu is used as the metal grid in place of Au and is deposited to a thickness of 3 microns. In operation, the device similarly switches from white to black within 100 milliseconds and then upon reversal of the electric field switches from black to white within 100 milliseconds. A dynamic range similar to that of Example 1 is demonstrated.

EXAMPLE 3

Examples 1 and 2 are repeated with the exception that Polytetrafluoroethylene is used as a substrate in place of polyethylene. In operation, switching speeds of the devices are similar to the devices of Examples 1 and 2, i.e., less than 100 milliseconds, and dynamic ranges are comparable.

EXAMPLE 4

Examples 1 and 2 are repeated with the exception that polyester is used as a substrate in place of polyethylene. In operation, switching speeds of the devices are similar to the devices of Examples 1 and 2, i.e., less than 100 milliseconds, and dynamic ranges are comparable.

EXAMPLE 5

Examples 1 and 2 are repeated with the exception that soda glass is used as a substrate in place of the polyethylene. In operation, switching speeds of the devices are similar to the devices of Examples 1 and 2, i.e., less than 100 milliseconds, and dynamic ranges are comparable.

EXAMPLE 6

Examples 1 and 2 are repeated with the exception that tin oxide is used as the metal oxide coating in place of the indium tin oxide. In operation, switching speeds of the devices are similar to the devices of Examples 1 and 2, i.e., less than 100 milliseconds, and dynamic ranges are comparable.

EXAMPLE 7

Examples 1 and 2 are repeated with the exception that zinc iodide is used in the electrolyte in place of zinc bromide. In operation, switching speeds of the devices are similar to the devices of Examples 1 and 2, i.e., less than 100 milliseconds, and dynamic ranges are comparable.

EXAMPLE 8

Examples 1 and 2 are repeated with the exception that poly-2-acrylamido-2-methylpropane sulfonic acid is used as the polymeric resin in place of the polyvinyl alcohol. In operation, switching speeds of the devices are similar to the devices of Examples 1 and 2, i.e., less than 100 milliseconds, and dynamic ranges are comparable.

EXAMPLE 9

Multiple display devices fabricated as in Example 1, having surface areas of 2.54 cm by 2.54 cm (1 inch by 1 inch), are positioned in 12 rows and 12 columns to form a 30.5 cm by 30.5 (1 foot by 1 foot) surface. Electrical contacts are made to the working electrode and counter electrode of each device. A 1.5 volt electric field is applied simultaneously to each device with the working electrode serving as the cathode. Within 100 milliseconds of application of the electric field, the entire 30.5 cm by 30.5 cm (1 foot by 1 foot) surface turns black. Reversal of polarity results in bleaching of the surface back to a white state within 100 milliseconds.

It is to be noted that the above description of the present invention is susceptible to considerable modification, change and adaptation by those skilled in the art, and that such modifications, changes and adaptations are intended to be considered within the scope of the present invention, which is set forth by the appended claims.

We claim:
1. A display device comprising:
   (a) a working electrode comprising a metal grid having an electrically conductive metal oxide coating disposed thereon;

(b) a counter electrode; and (c) an electrochromic material disposed between the working electrode and counter electrode wherein the electrically conductive metal oxide coating is disposed between the metal grid and the electrochromic material.

2. A display device according to claim 1, wherein the metal grid comprises Cu, Au, Ag, Al, Pt, Ni, Zn and combinations thereof.

3. A display device according to claim 1, wherein the metal grid comprises Au.

4. A display device according to claim 1, wherein the electrically conductive metal oxide coating comprises indium oxide, tin oxide, indium tin oxide, zinc oxide or cadmium stannate.

5. A display device according to claim 1, wherein the electrically conductive metal oxide coating comprises indium tin oxide.

6. A display device according to claim 1, wherein the working electrode further comprises a substrate upon which the metal grid and metal oxide coating are disposed.

7. A display device according to claim 6, wherein the substrate comprises a glass selected from soda glass and borosilicate glass.

8. A display device according to claim 6, wherein the substrate comprises a polymer selected from polyethylene polytetrafluoroethylene and polyester.

9. A display device according to claim 6, wherein the substrate comprises polyethylene.

10. A display device according to claim 1, wherein the electrochromic material comprises an aqueous solution of an electrodepositable metal.

11. A display device according to claim 10, wherein the electrodepositable metal is Zn, Co, Ni or combinations thereof.

12. A display device according to claim 10, wherein the electrodepositable metal is provided from a metal salt selected from chlorides, bromides, iodides and combinations thereof.

13. A display device according to claim 1, wherein the electrochromic material comprises a polymer selected from polyaniline, polyacetylene, polypyrrole and polythiophene.

14. A display device according to claim 1, wherein the electrochromic material comprises a metal oxide selected from $WO_3$, $MoO_3$, and $Ni(OH)_2$.

15. A display device according to claim 1, wherein the electrochromic material comprises Prussian blue.

16. A display device according to claim 1, wherein the device has a response time of less than about 200 milliseconds.

17. A display device according to claim 16, wherein the device has a surface area of greater than about 1 square inch.

18. A display device according to claim 1, wherein the device is capable of switching from a reflectance of greater than about 70 percent to a reflectance of less than about 30 percent.

19. A display device according to claim 1, wherein the electrically conductive metal oxide coating is transparent.

* * * * *